3,203,325
METHOD AND APPARATUS FOR MAKING DRINKING STRAW
Harry E. Davis, 544 Vinita St., and Fred B. Pfeiffer, 270 Ferndale Ave., both of Akron, Ohio
Filed May 9, 1963, Ser. No. 279,189
3 Claims. (Cl. 93—80)

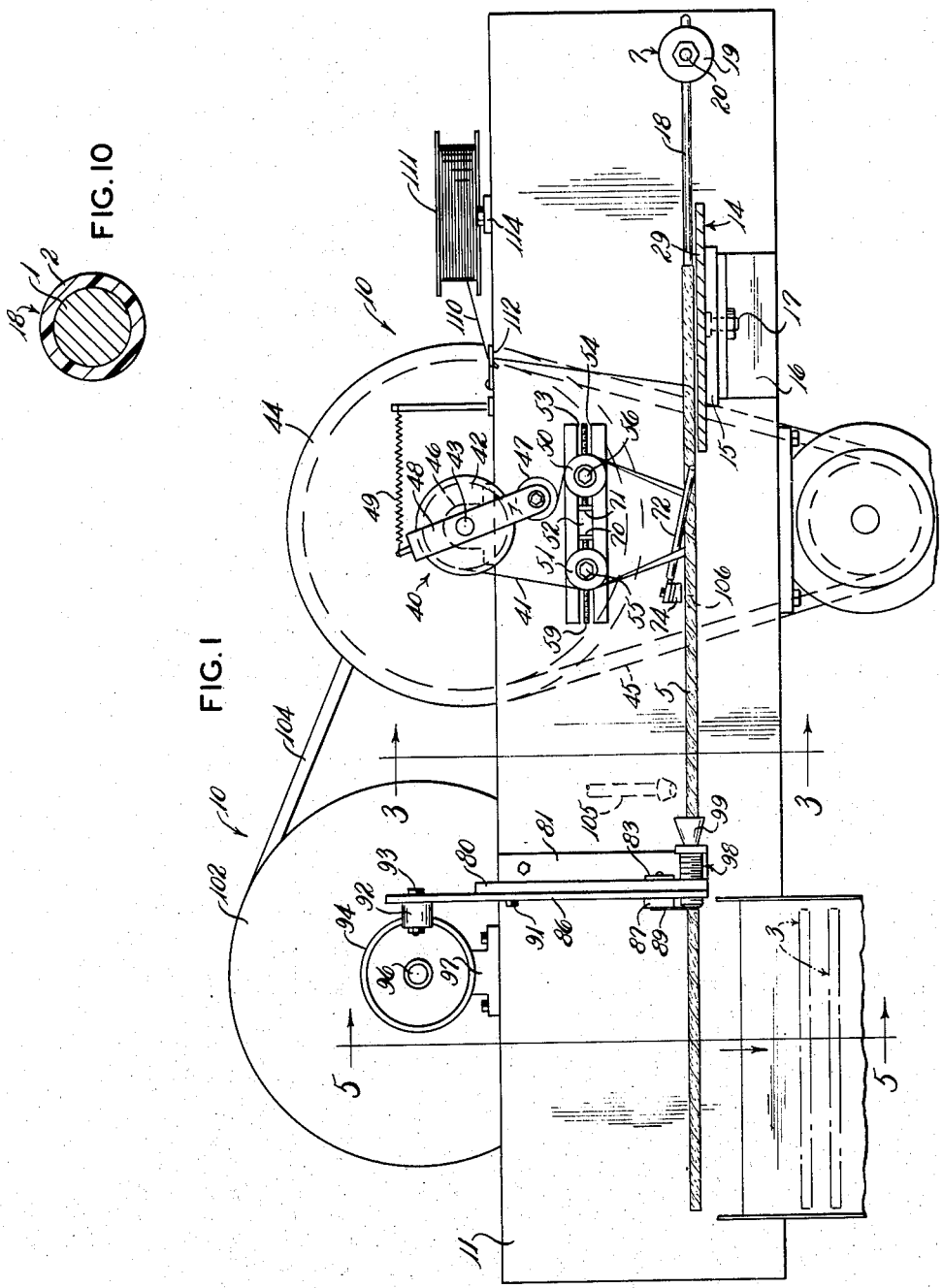

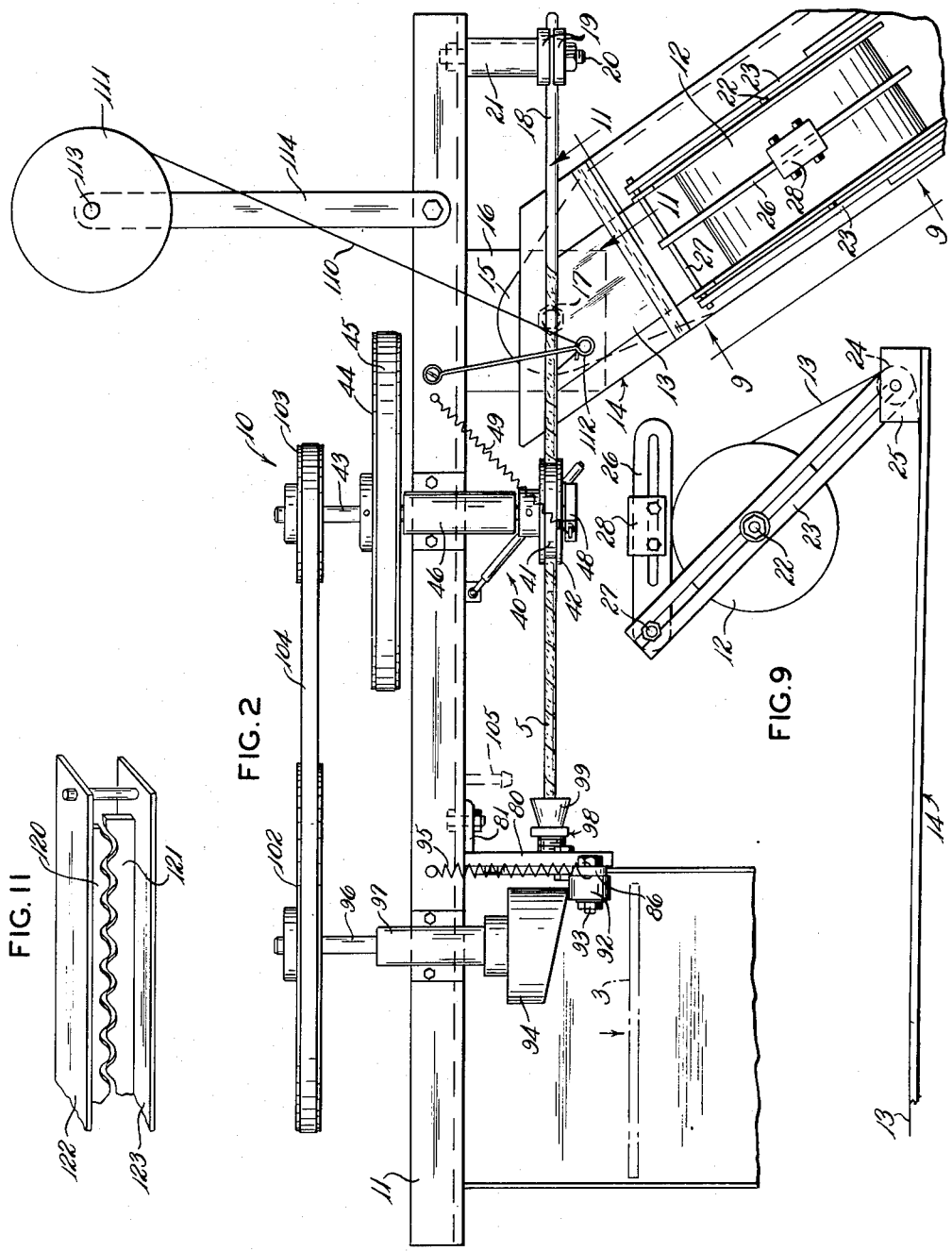

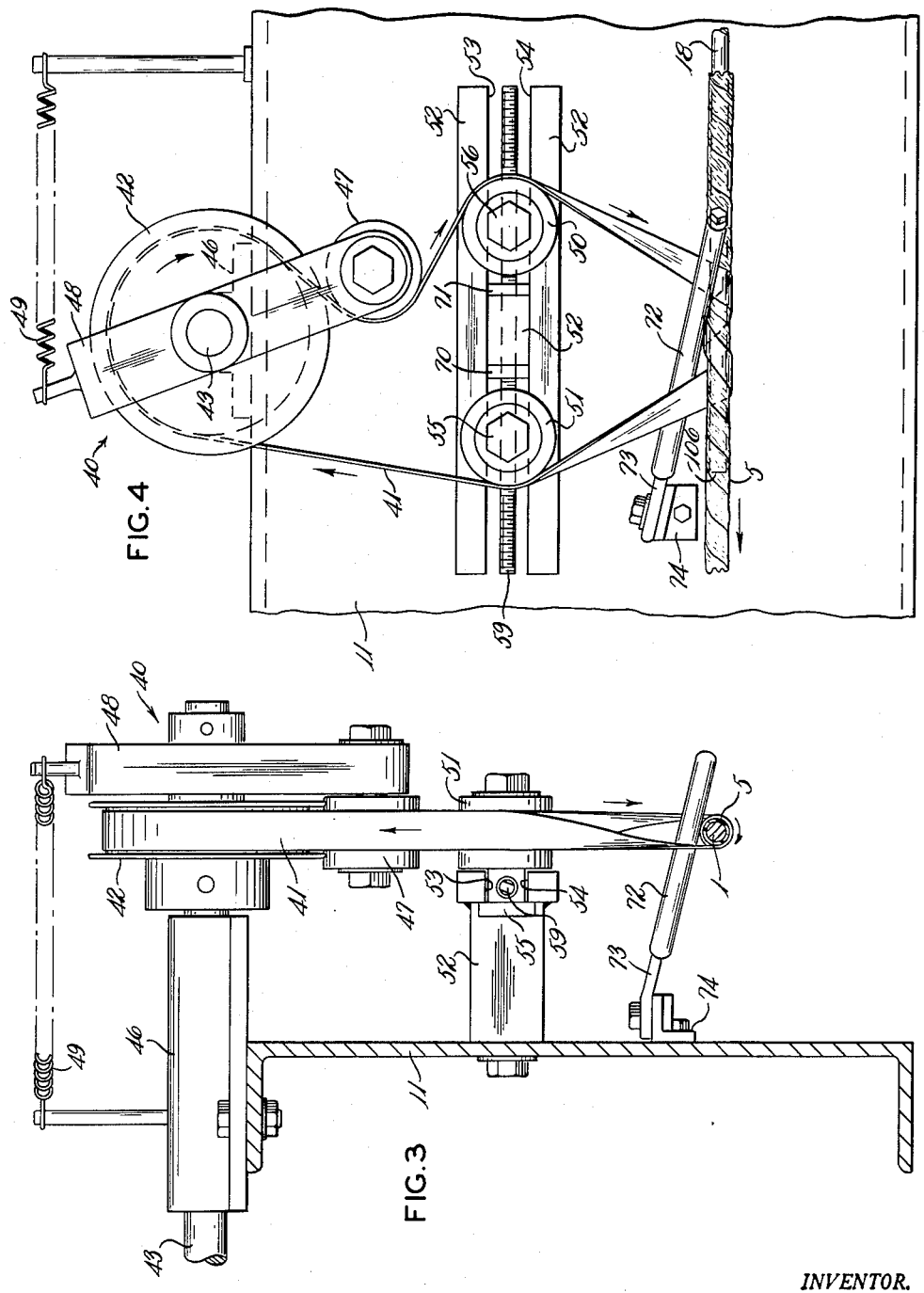

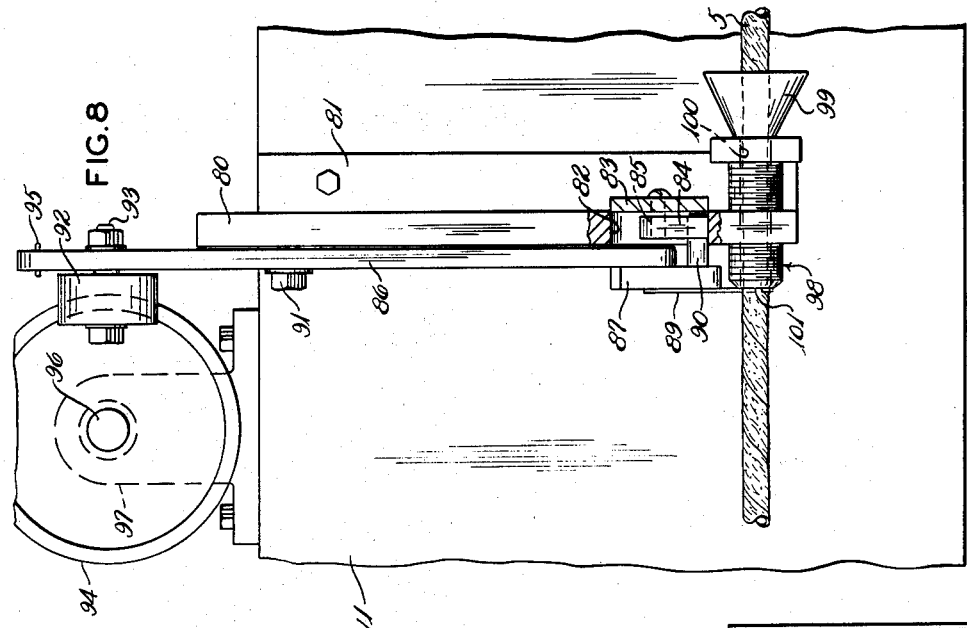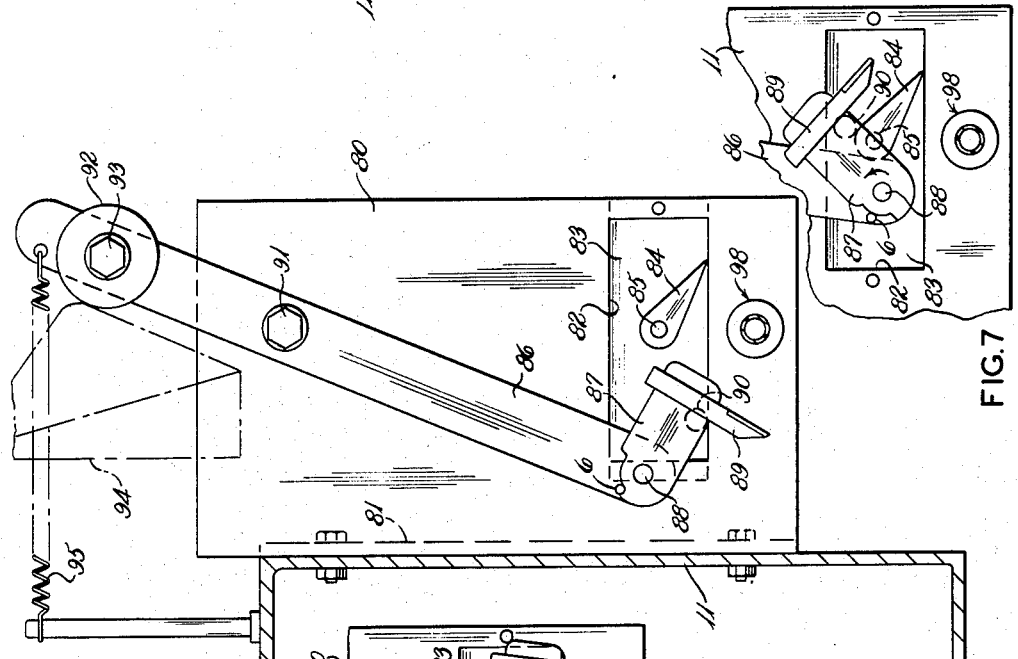

The present invention relates to a method and apparatus for making drinking tubes of the type generally known as straws and shall be referred to as "straws" in this application.

More particularly the invention relates to a continuous method and apparatus for making straws from a thin strip or strips of preheated heat-scalable regenerated cellulose, or similar sheet material, by spirally winding the strip or strips about an arbor, with the edges of strip or strips in over-lapped relation, to form a tube and revolving the tube as it is formed about and along the arbor thus forming a continuous length of tube and then cutting the tube as it passes through a cutting station, into lengths to form straws.

Heretofore drinking tubes or straws have been composed of spirally wound thin strips of cellophane (regenerated cellulose) but such straws and similar straws of the prior art have not been entirely satisfactory particularly due to lack of permanent adhesion of the material in the overlap and to inadequate structural features to permit desirable bending of the straw without collapsing the wall of the straw at the bend. Another unsatisfactory feature of the prior art straws formed of cellophane or the like is that the cross-sectional area of the passageway through the straw was insufficient to permit such beverage ingredients as ice cream mixes to be sucked through the straw. The wall of the straw would frequently collapse due to the vacuum created in the passageway between the user's mouth and the ice cream mix.

It is an object of the present invention to provide a straw of the character referred to above that has a passageway therethrough of a cross-sectional area large enough for the ready passage of ice cream mix when such is used in beverges such as milk-shakes, root beer and the like, with the body of the straw so constructed as to resist collapsing when used to suck ice cream or the like therethrough and also may be bent from its longitudinal axis a substantial degree without kinking or collapsing.

Another object of the invention is to reenforce the straw body against collapsing by means of a rib-like wrinkle or wrinkles extending spirally about the straw body and substantially the length thereof.

A further object of the invention is to impose numerous small wrinkles disposed at random in the straw body in the areas between the turns of the reenforcing wrinkles whereby the wall of the body is further strengthened but not to the extent provided by the said spirally disposed wrinkles, so that when the straw is subjected to substantial bending the passageway therethrough gradually and progressively closes as the bending becomes more extreme and the area of the wall ultimately closing the passageway extends spirally about the straw body and comes into contact with the greater resistance of the spirally disposed reenforcing wrinkles.

A still further object of the invention is to provide a straw having a wall that will resume its normal shape when relieved of a collapsing force such as sometimes occurs in their use by bending or pinching.

Yet another object of the invention is to provide means for bringing heated surfaces of heat sealable material immediately and forcibly into contact for adhesive purpose without the necessity of the heat from its source passing through the film and thereby the speed of operation of forming straws may be increased over the prior art.

Another object of the invention is to provide improved severing or cutting means to insure rapid clean cutting so that an end of a straw will not irritate a user's mouth. A still further object of the invention is to provide a heated arbor by the continuous application of heated film thereto whereby the preheated film retains its heated state when formed about the arbor and is drawn into a twisting means where it is subjected to radially compressive force.

Other objects and advantages of the invention will be manifest to those familiar with the art from the following description and by reference to the accompanying drawings wherein:

FIG. 1 is a front elevation of a machine embodying the present invention;
FIG. 2 is a top plan view of FIG. 1;
FIG. 3 is a view taken on line 3—3 of FIG. 1;
FIG. 4 is a front elevation of FIG. 3;
FIGS. 5, 6, 7 and 8 are views illustrating diagrammatically the relative movements of means for severing the tube;
FIG. 9 is an elevational view taken on line 9—9 of FIG. 2 showing a supply roll of film and means for supporting and applying controlled braking action to the roll;
FIG. 10 is a cross-sectional view of an arbor on which a tube is formed; and
FIG. 11 is a perspective view of means adapted to corrugate the film shown in FIG. 2.

Referring now to FIGS. 1 and 2 in detail apparatus referred to generally as 10 for practicing the novel method of the present invention is illustrated and comprise support means consisting of a channel 11 having suitable legs not shown. A supply roll 12 of heat sealable film 13 and heater means 14 is mounted on a plate 15 which in turn is adjustably mounted on an L shaped support 16 rigidly attached to said channel. The L shaped support is bolted to its support by bolts 17 in such manner as to permit angular adjustment of the delivery of film 13 to a stationary arbor 18 supported on channel 11 by means of a clamp 7 which includes washers 19 mounted on a bolt 20 attached to channel 11 and having spacing means 21 mounted on the bolt as will be seen by reference to the drawing.

Supply roll 12 is rotatably mounted on a shaft 22 (see FIG. 9) which in turn is adjustably mounted in a slotted arm 23. Arm 23 is rotatably attached to an angular bracket 25 by means of spindle bolt 24 at the outer end of plate 15.

A slotted brake arm 26 is bolted to arm 23 at 27 in pivotal relation to arm 23. Arm 26 is adapted to make frictional contact with the supply roll 12 and carries weight 28 adjustably mounted on arm 26 whereby tension on the film, to be delivered to the arbor, may be varied.

A heater unit 14 is adapted to heat film 13 previous to the latter's contact with arbor 18 and preferably is of the usual electrical type heater, except, it has a longitudinal convex surface against which film 13 makes contact as it travels from the supply roll to and under spindle bolt 24 to the arbor.

Means for longitudinally corrugating the heated film comprise furrowed plates 120 and 121 (see FIG. 11) attached to separable plates 122 and 123 respectively. The corrugated plates are spaced a short distance with the ridges of each plate aligned with the grooves of the other plate. Applicants have found that the spacing of the plates is effective in imparting corrugations to the film without creating objectionable drag as occurs when the corrugations of plates 120–121 intermesh. Plates 122–123 are supported on heater unit 14 and receives the heated film just prior to the film's contact with arbor 18.

By reference to FIG. 10 it will be seen that arbor 18 includes a metal rod 1 covered with a layer 2 of polytetrafluoroethylene known commercially as Teflon. The arbor has a cross-sectional contour and area which determines the size and shape of the passageway through the straw being made.

As explained arbor 18 is supported in clamp 19 and it is to be understood that the arbor is longitudinally adjustable relative to the clamp which is a useful feature because such anti-friction material as Teflon is expensive and said adjustment makes possible presenting new surface of arbor at stations where wear may be localized. Additionally the longitudinal adjustment of the arbor gives leeway in positioning the free end 106 of the arbor relative to an actuating belt now to be described.

Initially film 13 is manually lead under spindle bolt 24, over the top surface of heater 14, through said corrugating means to, under, and spirally around and along arbor 18 and fed into actuating means referred to generally as 40.

Actuating means 40 is adapted to simultaneously rotate and advance the film relative to the arbor and it comprises (see FIGS. 3 and 4) a belt 41 driven by pulley 42 mounted on a motor driven shaft 43 driven by means of pulley 44 which is driven by belt 45 from a motor not shown. Shaft 43 is mounted in a bearing 46 on channel 11. By reference to directional arrows it will be seen that belt 41 passes from pulley 42 around a belt tensioning pulley 47 mounted on arm 48 which arm pivots about shaft 43 and is tensioned by spring 49 as will be understood by reference to the drawing. Belt 41 passes to adjusting pulley 50 and spirally around film 13 on arbor 18 and thence to adjusting pulley 51 back to pulley 42.

Adjustable pulleys 50 and 51 are idler pulleys mounted in a T shaped member 52 with the stem of the T attached to and extending from channel 11. Pulleys 50 and 51 are slidably mounted on number 52 in slots 53 and 54 by means of bolts 55 and 56 respectively. Bolts 55 and 56 are provided with right-handed and left-handed threaded holes 57 and 58 respectively, hole 58 not being shown. A rod 59 has a right-handed and a left-handed threaded end in threaded engagement with holes 57 and 58 respectively. Rod 59 is journalled in member 52 as shown and has attached retaining collars 70 and 71 to prevent longitudinal movement of the rod. Means, not shown, for turning rod 59 may consist of screw-driver slots in the end of the rod.

It is to be noted that arbor 18 is supported in its clamp 19 a substantial distance from the application of belt 41 about the film on the arbor. The forces exerted by belt 41 tends to deflect the arbor toward pulley 42 and latterly away from the line the belt leaves the film on the arbor. A restraining member in the form of an idler roller 72 mounted on shaft 73 is adjustably mounted on bracket 74 the latter being attached to channel 11.

Roller 72 is composed of anti-friction material or covered with such material as Teflon and the roll is so disposed as to contact belt 41 diagonally of the arbor between the approaching and the receding extent of the belt's contact with the film. It is an important feature of the invention that the axis of roller 72 is at a right angle to the belt at the point of the roller's contact therewith and so adjusted as to counteract the deflecting forces of the belt on the arbor. While roller 72, as described, is the preferred means for counteracting the deflecting force of the belt 41, it is obvious that other means, such, for example, as a second belt, to counteract the deflecting force of belt 41, may be employed, and it is to be understood that the invention is not limited to the specific means of belt 41.

Since heated film 13 is continuously brought into contact with the arbor and is drawn in tubular form longitudinally along the arbor by and between the belt 41 and the arbor it will be seen that the belt exerts a radially inwardly force on the film thus pressing the heat sealable surfaces of the various layers of the heated film firmly together whereby an airtight body is provided.

Means for severing the tube 5, after the tube leaves the arbor 18 to form straws 3 is illustrated in FIGS. 5, 6, 7 and 8 to which reference will now be had. As best shown in FIG. 5 a plate 80 is bolted to angle 81 which in turn is bolted to channel 11. A rectangular opening 82 through plate 80 is closed, as shown, by a plate 83 bolted to plate 80. A dog 84 is pivotally mounted on a pin 85 extending from plate 83. The outer surface of the dog and pin 85 are below the surface of plate 80 to permit an actuating lever 86 to pass over dog and pin. A knife holding arm 87 is pivotally attached to lever 86 by a pin 88 and a knife 89 is attached at the outer end portion of arm 87 as shown. A following pin 90 is also attached to arm 87 and projects into the opening 82 a distance sufficient to engage dog 84 when the severing mechanism is actuated.

Lever 86 is pivotly attached to plate 81 by bolt 91. A cam roller 92 is bolted to lever 86 by bolt shaft 93 and is adapted to engage cam 94 under the influence of spring 95. As can be seen by reference to FIG. 8 cam 94 is mounted on shaft 96 journalled in bearing 97 mounted on channel 11.

A cutting die 98 is in threaded relation to plate 80 and has a funnelled receiving end 99 leading into a longitudinal bore 100 and an outlet end having a slightly tapered surface 101 across and against which knife 89 passes when tube 5 is being severed into straws 3.

Actuating means for cam shaft 96 comprise driven pulley 102 and driving pulley 103 and belt 104. Pulley 103 is an adjustable pulley the interval of the cut may be varied in relation to the forward speed of travel of tube 5.

An air duct 105 (see FIG. 1) is so disposed as to blow cooling air against the tube as the tube passes from the end 106 of the arbor to the severing mechanism. Cooling facilitates the cutting of the tube.

Means for reenforcing and adding to the attractive appearance of the straw comprise a narrow strip 110 of colored heat sealable cellophane lead from a supply roll 111 (see FIG. 2) through an eyelet 112 and a second eyelet not shown, but located above the strip of film 13 a short distance from the left-hand edge of the film 13. From the last mentioned eyelet the narrow strip is fed under the arbor over film 13 and thus being spirally wound into the body of tube 5 between outer two layers of the body. Roll 111 is mounted on a shaft 113 supported by an arm 114 bolted to channel 11. Any type braking means may be applied to roll 111 if braking is found desirable. Also for decorative purpose a strip or other design may be printed on strip 13 in which case strip 110 may or may not be omitted.

*Operation*

In operation, if, for example, a straw having four layers of film is desired the film may be 2½" wide and plate 15 disposed at an angle to the arbor to provide a ⅝" overlap of the film edge as the film is spirally wound about the arbor. As stated the film is initially manually wound under and about the arbor and advanced to become engaged by actuating means 40. With the film so disposed and with the means 40 and the severing means actuated by their power driven mechanisms the film is twisted around and advanced longitudinally along the arbor to and through the severing mechanism.

A principal and important feature of the invention is the heating of the film before and during the film's contact with the arbor. By reference to FIGS. 1 and 2 it will be seen that heater 14 extends under, beyond and closely spaced to the arbor. Film 13 passes in direct contact with the convex surface of the heater and thus the film's heat sealable surface is subjected to direct heating without the necessity of the heat passing through the film to reach its surface, thus with the film wound about the arbor as explained it will be seen that the film surface that has directly contacted the heater surface is brought into contact with the film wound on the arbor while the film is in a state to provide its maximum adhesion whereby a permanent welding of the contacting surfaces is promoted. Only sufficient tension is applied to supply roll 12 to insure a desired loose winding of the film on itself.

The pitch of the turns of belt 41 about tube 5 on the arbor may be varied by turning threaded rod 59. It is obvious that the pitch of the belt 41 about the film on the arbor controls the forward travel of the film on the arbor and accordingly the means for changing the pitch is important to accommodate various widths of film so as to provide the necessary lap of edges to produce a uniform body structure of tube.

The novel operation of the severing mechanism is another important feature of the invention, particularly in respect to the speed the knife passes, in one direction only, through the moving tube. Also in the adjustable cutting die which contacts the knife as it cuts and during the cut deflects the knife axially of the tube to compensate for the longitudinal travel of the tube during the interim of the cutting. While the cutting is rapid, applicants have discovered that this deflection of the knife results in better operation of the severing mechanism and reduces involuntary stops that sometimes occurs due to the tube crowding the knife.

The length of the straw is determined by the adjustment of the adjustable pulley driving cam 94. When cam roller 92, on arm 86, reaches the release station of cam 94 the spring 95 causes arm 86 to pivot about bolt 91 and the knife, pivotally mounted on arm 87, to cut through tube 5 at extremely high velocity. As the cam 94 continues to revolve with its follower roller in contact the ends of arm 86 reciprocate thus arm 87 moves back and forth in opening 82 and following pin 90 contacts an edge of the opening passing under dog 84 which is pivotally mounted on pin 85. To insure pin 90 keeping in contact with surfaces to be followed, arm 87 is provided with a tension spring 6. The pointed end of the dog returns into contact with the edge of the opening by gravity, or by means of a suitable spring if such is found desirable, as soon as pin 90 passes thereunder and as will be understood by reference to the drawing, pin 90 follows over the top of the dog in the pin's return movement thereby lifting and returning the knife over the tube to its cocked position.

Returning now to the application of the film about the arbor it has been noted that the right-hand edge of the film is drawn tightly onto the previously wound film and the left-hand edge is loosely wound. As belt 41 twists and pulls the film to it along the arbor the loosely wound film gathers against the tightly wound area where it accumulates into a substantial spiral wrinkle which provides rib-like reenforcement to the wall of tube 5. The twisting also reduces the diameter of the loosely wound material which with the twisting force cause the formation of numerous small, some minute, wrinkles in the film between the said substantial wrinkles. The corrugations in the film described heretofore effectively promote the forming of the wrinkles and particularly the small wrinkles. It is to be further understood that the invention contemplates other forms of wrinkles than the corrugations in film 13 and the forming of such wrinkles in the film before it is wound into supply roll 12. For example, a sheet of cellophane or other satisfactory film may be wrinkled as by the method and apparatus disclosed in the Fred B. Pfeiffer Patent No. 2,934,865, dated May 3, 1960, and if such wrinkled material be substituted for roll 12 material then the present corrugating may be omitted or retained to further wrinkle the film by corrugating as described. Both types of wrinkles pass through belt 41 where they are subjected to forcible radially inwardly pressure and the tube is pushed by the action of belt 41 into the severing means. Since the twisting action of belt 41 reduces the diameter of tube 5 it is desirable to terminate the arbor as at 106 with only a short extension beyond belt 41.

The solidity of the wall of straw 3 between the said substantial reenforcing wrinkles is important if not a controlling factor in reference to the amount of bending the straw will stand before the passageway closes. If the loose winding is too extreme the wall at the small wrinkles is too soft and sponge-like to function satisfactorily. On the other hand if the looseness of the winding is reduced to substantial tightness then the small wrinkles may disappear or leave the wall at that area so solid that the straw will kink when bent only slightly. Accordingly the feature of the angular adjustment of plate 15 relative to the arbor makes possible the control of the loose and tight winding and thereby makes convenient a trial and error adjustment to produce the condition of winding that results in a satisfactory and improved straw over the prior art straws. Obviously the said winding of the film will be different according to film used, temperatures, humidity, etc., and the present invention makes such necessary adjustments to meet such changes to be conveniently and quickly made.

The invention has been described with the use of film regenerated cellulose wound on a fixed arbor 18 but it is not to be so limited as any other film found satisfactory is contemplated and arbor 18 may be permitted to freely rotate by substituting a thrust-bearing for its support instead of clamp 7 as will be understood by those of ordinary mechanical skill. Applicants have found that the adhesion in the overlap of film 13 is somewhat improved when the arbor is permitted to rotate by the driving force of belt 41 through the film on the arbor, however, with the film described above, by way of example, the adhesion is satisfactory in the overlap and between the layers of strip 13 and the desirable wrinkling is promoted.

From the foregoing it is evident that we have provided novel method steps and apparatus for producing drinking straws. Obviously the invention is susceptible of numerous modifications and the right is herein reserved to make such changes as fall within the scope of the appended claims without departing from the spirit of the invention.

We claim:
1. A method of making a drinking straw of thin heat sealable material of the character described comprising the steps of:
  (a) continuously feeding a strip of substantial width of said material to an elongated arbor and spirally winding the strip thereon,
  (b) heating the strip prior to its contact with the arbor and maintaining the strip at heatsealing temperature at the time it is wound on the arbor,
  (c) heating the arbor by transfer of heat from the strip thereto,
  (d) wrinkling the strip before it is wound on the arbor,
  (e) feeding said strip onto and about the arbor at such angle relative thereto as to provide an overlap of the edges of the strip such as to form a tube of multi-layers on the arbor,
  (f) wrinkling the wall of said tube by simultaneously rotating and twisting the tube around its longitudinal axis while advancing the tube lengthwise of the arbor,
  (g) subjecting the tube to radially inwardly pressure,
  (h) advancing the tube from said arbor into a cutting station and there cutting the tube into predetermined lengths.

2. A method according to claim 1 including the addition of feeding a decorative strip of heatsealable material, said decorative strip being narrow relative to said strip of substantial width, onto a marginal edge of the latter and heatsealing the strips together as the strips are simultaneously wound on the arbor.

3. In a machine for making drinking straws of thin heatsealable strip material, the combination of:
 (a) a supply roll,
 (b) an elongated anti-friction arbor,
 (c) means adapted to draw a strip of material from the supply roll and spirally applying the strip on the arbor,
 (d) means for progressively heating the strip to heatsealing temperature before and during its application to the arbor,
 (e) said heating means being angularly adjustable to and in the plane of the longitudinal axis of said arbor and being adapted to deliver said strip to said arbor at various selected angles to establish the pitch of said spiral winding, whereby the number of layers of said material that form the drinking straw body may be controlled,
 (f) means for wrinkling said strip of material prior to the material's application to said arbor, said wrinkling means comprising corrugated confronting surfaces and means adapted to draw said strip material against said surfaces as the strip passes to said arbor,
 (g) said drawing means, subparagraph (c) above, being adapted to concurrently advance and spirally wind material along the arbor and to exert a radially inwardly and twisting force on the material on the arbor and thereby complete the tube and project the tube from the arbor into a cutting station, and
 (h) cutting means adapted to sever said tube into predetermined lengths.

References Cited by the Examiner
UNITED STATES PATENTS

| | | | |
|---|---|---|---|
| 1,582,079 | 4/26 | Parsons et al. | 93—80 |
| 1,941,993 | 1/34 | Minton | 93—80 |
| 2,048,360 | 7/36 | Spanel et al. | |
| 2,212,915 | 8/40 | Dieffenbach | 93—80 |
| 2,224,370 | 12/40 | Westcott | 156—419 X |
| 2,575,417 | 11/51 | Heyman | 83—607 X |
| 2,872,767 | 2/59 | Clem | 93—80 X |
| 3,108,516 | 10/63 | Elam | 93—80 |

FRANK E. BAILEY, *Primary Examiner.*
BERNARD STICKNEY, *Examiner.*